United States Patent
Sugiyama

(10) Patent No.: US 11,465,902 B2
(45) Date of Patent: Oct. 11, 2022

(54) METHOD FOR PRODUCING HYDROGEN GAS

(71) Applicants: Osamu Sugiyama, Nagoya (JP); Yuka Mizuguchi, Nagoya (JP); Kana Mizuguchi, Nagoya (JP); Etsuko Mizuguchi, Nagoya (JP)

(72) Inventor: Osamu Sugiyama, Nagoya (JP)

(73) Assignees: Osamu Sugiyama, Nagoya (JP); Yuka Mizuguchi, Nagoya (JP); Kana Mizuguchi, Nagoya (JP); Etsuko Mizuguchi, Nagoya (JP)

( * ) Notice: Subject to any disclaimer, the term of this patent is extended or adjusted under 35 U.S.C. 154(b) by 285 days.

(21) Appl. No.: 16/644,323

(22) PCT Filed: Aug. 13, 2018

(86) PCT No.: PCT/JP2018/030197
§ 371 (c)(1),
(2) Date: Apr. 7, 2020

(87) PCT Pub. No.: WO2019/049611
PCT Pub. Date: Mar. 14, 2019

(65) Prior Publication Data
US 2020/0325018 A1    Oct. 15, 2020

(30) Foreign Application Priority Data
Sep. 8, 2017   (JP) .............................. JP2017-172611

(51) Int. Cl.
*C01B 3/08* (2006.01)
*B01J 21/18* (2006.01)

(52) U.S. Cl.
CPC .................. *C01B 3/08* (2013.01); *B01J 21/18* (2013.01)

(58) Field of Classification Search
CPC ... C01B 3/08; C01B 3/02; C01B 32/05; B01J 21/18; Y02E 60/36; C02F 1/68
See application file for complete search history.

(56) References Cited

U.S. PATENT DOCUMENTS

2016/0318761 A1   11/2016   Hirao et al.

FOREIGN PATENT DOCUMENTS

| JP | 62-263946 A | 11/1987 |
| JP | 2000-319011 A | 11/2000 |
| JP | 2003-26408 A | 1/2003 |
| JP | 2003026408 A | * 1/2003 |
| JP | 2005-289796 A | 10/2005 |
| JP | 2007-45646 A | 2/2007 |
| JP | 2007-131481 A | 5/2007 |
| JP | 6190084 B1 | 8/2017 |
| WO | 2011/048685 A1 | 4/2011 |
| WO | 2012/140726 A1 | 10/2012 |
| WO | 2015/099129 A1 | 7/2015 |

OTHER PUBLICATIONS

ShinyaSato et al. "Hydrogen production from heavy oil in the presence of calcium hydroxide" Fuel 82 (2003) 561-567 (Year: 2003).*
International Search Report dated Oct. 23, 2018, issued in counterpart International Application No. PCT/JP2018/030197 (2 pages).

* cited by examiner

*Primary Examiner* — Steven J Bos
*Assistant Examiner* — Syed T Iqbal
(74) *Attorney, Agent, or Firm* — WHDA, LLP

(57) ABSTRACT

A method for producing hydrogen gas, is disclosed which is characterized by reacting "mineral ion water containing at least alkaline earth metal ions and having pH of 11 or more to 14 or less" and "mineral-supported high-temperature burned carbonaceous substances made by impregnating mineral ion water in an organism-derived carbon precursor and burning the precursor at high temperature"; a mineral-supported high-temperature burned carbonaceous substance for the above-mentioned method of producing of hydrogen gas; and a method for producing mineral ion water for the above-mentioned method of producing hydrogen gas, wherein the mineral ion water is made by dissolving at least oxide, hydroxide, carbonate, or hydrogencarbonate of magnesium or calcium in water to contain alkaline earth metal ions in the water, adjusting pH of the water, and dissolving a water-soluble component of organism-ash in the water.

8 Claims, No Drawings

METHOD FOR PRODUCING HYDROGEN GAS

TECHNICAL FIELD

The present invention relates to a method for producing hydrogen gas, and more specifically to a method for producing a highly purified hydrogen gas using alkaline mineral ion water containing specific mineral ions and specific mineral-supported high-temperature burned carbonaceous substances.

BACKGROUND ART

Conventionally, as methods for producing hydrogens, the water vapor reforming method, which takes hydrogen from water or methane by heat obtained by combusting fossil fuels, the electrolytic method, which electrolyzes water by electricity obtained by combusting fossil fuels, and the method, which obtains hydrogen as a product gas in factories, and so on, are known. However, these methods were problematic in terms of environmental conservation, and so on. The production methods of fossil fuel-based hydrogen gases are not "$CO_2$ free" because of the small amounts of carbon monoxide (CO) and carbon dioxide ($CO_2$) as impurities.

As a method by which users obtain hydrogen in situ, there is a convenient method obtaining hydrogen from a hydrogen cylinder, but there were similar problems to the method for producing hydrogen mentioned above, if they follow the original method.

Also, as methods for producing hydrogen, a method obtaining hydrogen from hydrogenated compounds; and a method obtaining hydrogen by reacting metals having high ionization tendency such as aluminum, zinc, etc., with acidic water solutions (e.g., Patent Documents 1-4), are known.

However, these methods have problems when hydrogen is formed. For example, in the case of aluminum, because of the deposit of aluminum oxide and aluminic acid generated, the reaction stops. Moreover, since aluminum-containing ions that were ionized and dissolved in water were unfavorable for the organism, there was no chances for effective utilization of the residual water after hydrogen generation.

Therefore, a method for generating hydrogen gas with high purity, which is environmentally friendly and cost-effective, was desired.

PRIOR ART DOCUMENTS

Patent Documents

Patent Document 1: JP S62-263946A
Patent Document 2: JP 2007-045646A
Patent Document 3: JP 2007-131481A
Patent Document 4: WO 2015/099129

SUMMARY OF THE INVENTION

Problems to be Solved by the Invention

The present invention has been accomplished in view of the above-mentioned background art, and a problem thereof is to provide a method for producing highly purified hydrogen gas in a simplified manner and in a cost-effective manner.

Means for Solving the Problems

The present inventor found that hydrogen gas can be obtained from "mineral ion water containing specific ions and limited to the range of high pH" and "mineral-supported high-temperature burned carbonaceous substances obtained by a specific method", and found that the above problem can be solved. Conventionally, in order to produce hydrogen gas, "metals having high ionization tendency or their alloys (0-valent metals (alloys) per se") have been used. The inventor has found that hydrogen gas can be produced in an extremely favorable manner by using carbonaceous substances obtained by a specific method, whereby he has accomplished the present invention.

That is, the present invention is directed to a method for producing hydrogen gas, characterized by reacting "mineral ion water containing at least alkaline earth metal ions and having pH of 11 or more to 14 or less" and "mineral-supported high-temperature burned carbonaceous substances made by impregnating mineral ion water in an organism-derived carbon precursor and burning the precursor at high temperature".

The present invention is further directed to a mineral-supported high-temperature burned carbonaceous substances for the above-mentioned method of producing of hydrogen gas, characterized in that the mineral-supported high-temperature burned carbonaceous substances is made by impregnating the mineral ion water in an organism-derived carbon precursor and burning the precursor at high temperature.

The present invention is further directed to a method for producing mineral ion water for the above-mentioned method of producing hydrogen gas, characterized in that the mineral ion water is made by dissolving at least oxide, hydroxide, carbonate, or hydrogencarbonate of magnesium or calcium in water to contain alkaline earth metal ions in the water, adjusting pH of the water, and dissolving a water-soluble component of organism-ash in the water.

Effects of the Invention

According to the present invention, hydrogen gas with high purity can be provided continuously and stably without generating carbon dioxide. Despite the present invention is extremely friendly for the environment and is very simple and inexpensive as a system, the present invention enables to produce and provide hydrogen gas suitably. Therefore, the above problem can be solved.

Since a method for producing hydrogen gas of the present invention does not use fossil fuels (does not rely on fossil fuels), the present invention is capable of generating hydrogen gas simply on-site at sites where hydrogen gas is required. According to the present invention, hydrogen gas can be safely produced in general homes, food factories, vehicle loads, etc. Namely, said mineral ion water and said carbon catalyst enables to safely generate hydrogen gas in any place.

In addition, a method for producing hydrogen gas of the present invention does not use electricity as in the electrolysis method, but uses water and seawater materials, which are almost inexhaustible, so hydrogen gas can be obtained inexpensively and it is also environmentally friendly. Further, a method for producing hydrogen gas of the present invention enables contribution for the construction of carbon dioxide-free hydrogen society, since the energy which is not dependent on fossil fuels is obtained.

In particular, further cost-reduction and environmental conservation can be achieved by using, for example, slaked lime, quicklime, calcium carbonate, etc., as materials for mineral ion water, and further by obtaining them from organism-derived products such as coral stones, egg shells and shells, etc.

Also, by containing a water-soluble component of organism-ash in mineral ion water, hydrogen gas can be produced suitably without cost enhancement.

Besides, further cost reduction can be achieved by using seawater or inland water to obtain mineral ion water.

In addition, for the other components, mineral-supported high-temperature burned carbonaceous substances, the material, the organism-derived carbon precursor, is organism-derived and does not need to contain 0-valent metals (alloys). Therefore, in the present invention cost reduction and environmental conservation can be achieved despite it enables to produce hydrogen gas suitably.

Besides, further cost reduction and environmental conservation can be achieved by using grasses, seaweeds, etc., as organism-derived carbon precursors.

In the present invention, instead of a previously required metals (alloys) having high ionization tendency, mineral-supported high-temperature burned carbonaceous substances are used, and preferably unique mineral-supported high-temperature burned carbonaceous substances which are made in carbon plasma. Therefore, according to the present invention, pure hydrogen gas is obtained. In addition, after hydrogen gas has been exhausted, mineral ion water maintains a high pH with the effect of the carbonaceous substances and has high amount of dissolved oxygen. Thus, the mineral ion water can be recycled as oxygen-containing mineral ion water.

Also, since the above mineral-supported high-temperature burned carbonaceous substances can be used repeatedly as catalysts, the present invention has an extremely economic effect.

EMBODIMENTS TO CARRY OUT THE INVENTION

In the following, the present invention is explained, but the present invention is not limited by the following specific embodiments, and can be optionally changed within the range of the technical thought of the present invention.

The method for producing hydrogen gas of the present invention is characterized by reacting "mineral ion water containing at least alkaline earth metal ions and having pH of 11 or more to 14 or less" and "mineral-supported high-temperature burned carbonaceous substances made by impregnating mineral ion water in an organism-derived carbon precursor and burning the precursor at high temperature".

Mineral Ion Water

The term "mineral ion water" as used in the present invention refers to a water solution containing at least alkaline earth metal ions and having pH of 11 or more to 14 or less.

In the present invention, "mineral ion water (A)" and "mineral-supported high-temperature burned carbonaceous substances made by impregnating mineral ion water (B) in an organism-derived carbon precursor and burning the precursor at high temperature" are reacted. The following description is common to both the above mineral ion water (A) and the above mineral ion water (B). Mineral ion water (A) and mineral ion water (B) used in practice can be exactly identical or can be different (in composition) under the following requirement.

The above alkaline earth metal ions (ions of Group 2 elements) include magnesium ions, calcium ions, strontium ions, barium ions, etc.

Magnesium ions ($Mg^{2+}$) or calcium ions ($Ca^{2+}$) are preferred, and calcium ions ($Ca^{2+}$) are particularly preferred, since hydrogen gas is generated suitably and compounds containing these ions are inexpensive. These ions may be contained alone or in combination of two or more.

When magnesium ions ($Mg^{2+}$) and calcium ions ($Ca^{2+}$) are contained, their mixing ratio is preferably $Ca^{2+}$ rich molar ratio, and is particularly preferably $Ca^{2+}/Mg^{2+}=10/10\text{-}19/1$ (molar ratio).

Concentration of alkaline earth metal ions in mineral ion water, as the total mass of alkaline earth metal ions, is preferably 10% by mass or more, more preferably 12% by mass or more, particularly preferably 15% by mass or more. The upper limit of the concentration is determined by the pH range.

The "compounds that dissolve in water to give alkaline earth metal ions" (hereafter referred to as "alkaline earth metal ion-supplying compounds") include oxides, hydroxides, carbonates, hydrogencarbonates, etc. of the alkaline earth metal. The "alkaline earth metal ion-supplying compounds" are more preferably oxides, hydroxides, carbonates, hydrogencarbonates, etc. of magnesium or calcium, especially preferably oxides, hydroxides, carbonates, hydrogencarbonates, etc. of calcium, particularly preferably calcium hydroxide (slaked lime). These compounds may be used alone or in combination of two or more.

"Alkaline earth metal ion-supplying compounds" can be obtained from rocks such as limestone; organism-derived products such as coral stones, egg shells, shells, and baked shells. Further cost-reduction is achieved by using these materials. It is also preferred to use so-called "calcareous" including above-mentioned materials.

The use of organism-derived products as alkaline earth metal ion-supplying compounds is preferable in terms of its availability as waste, cost advantages, and friendliness to human body and nature, and so on. As organism-derived products, materials specifically mentioned above are particularly preferable for the above-mentioned reason.

It is preferable that the amounts of alkaline earth metal ions in mineral ion water and alkaline earth metal ion-supplying compounds used for the preparation of mineral ion water are such that the resulting mineral ion water is in the pH range described later.

Desired mineral ion water can be obtained by adding alkaline earth metal ion-supplying compounds into water (preferably dissolving and maturing the alkaline earth metal ion-supplying compounds i.e. standing still), and if necessary, filtering supernatant water after maturation. These compounds may be used alone or in combination of two or more.

When only calcium hydroxide (slaked lime) is used as an alkaline earth metal ion supply compound, compared with the amount of total water, the amount of calcium hydroxide is preferably 12% by mass or more, particularly preferably 15% by mass or more.

When alkaline earth metal ions other than calcium ions are included as alkaline earth metal ion-supplying compounds, or when alkaline earth metals are added, dissolved and ionized in forms other than hydroxides, the preferred concentration of alkaline earth metal ions should be determined by the moles (molar concentration) of the calcium hydroxide (calcium).

It is essential that mineral ion water in the present invention have a pH of 11 or higher to 14 or lower. The pH is preferably 12 or higher to 14 or lower, particularly preferably 12 or higher to 14 or lower. Such pH ranges of the mineral ion water enable to suitably produce hydrogen gas upon interaction with mineral-supported high-temperature burned carbonaceous substances, as discussed below.

It is preferable to adjust the pH, including the alkaline earth metal ion-supplying compounds, and organism-ash (a water-soluble component of organism-ash) described below. It is also possible (and not excluded) to use other compounds that are alkaline in water.

Mineral ion water in the present invention preferably contains "a water-soluble components of organism-ash", in view of abundant resources, excellent cost performance, and effective availability of waste.

Trace elements in organisms include sodium, potassium, magnesium, calcium, phosphorus, zinc, manganese, selenium, iron, copper, etc. Mineral ion water has a property that which is highly alkaline but very mild and non-irritating as water. Metal ions ether than alkaline earth metal ions are considered to improve that property.

In particular, it is more preferable that the above organisms are protista or plants. The protists include algae, protozoa, etc., and the plants include seed plants, etc. Protists or plants are preferred to contain a many mineral components.

As the algae, marine algae and the like are preferable, and among them, green algae; brown algae such as mozuku, kombu, wakame, hondawara (*Sargassum fulvellum*), hijiki and the like; red algae; diatoms and the like, are more preferable.

As the seed plants, chanoki (*Camellia sinensis*) or the like is preferred, among them, their leaves, stems, roots, etc. are more preferable. Tea leaves are particularly preferable.

Among them, as "organisms" above, plants or seaweeds are preferred since they are mineral-rich as ingredients.

In addition, the above-mentioned "organisms" are preferable to be organisms contained in waste (organisms themselves, processed products of organisms, organism-derived products, etc.) in terms of environmental load.

Such wastes include seed plant-derived varieties such as tea shells, root vegetable processing residues, weeds; and seaweeds such as "brown algae such as hondawara". The waste may also include bacterial bed residue, etc.

"Organism-ash" is ash of the above organisms. Ash of plants is suitably used.

Mineral ion water in the present invention preferably contains "a water-soluble component of organism-ash". The water-soluble component may be separated from the ash, which may be added into mineral ion water. Also, in order to contain only water-soluble components, the ash may be added into "mineral ion water (water that constitutes the mineral ion water)", and supernatant water may be filtered after standing still (maturating). That is, the resulting filtrate may be added.

Water used for the preparation of mineral ion water is not particularly limited and includes demineralized water, distilled water, municipal water, pure water, inland water, seawater, etc. Among them, inland water obtained from lakes, marshes, rivers, and wells (groundwater); seawater; etc. are preferred because they enable cost reduction and already contain a large amount of sodium and other mineral components. Seawater is preferred in that it contains more mineral components when compared to inland water.

The present invention is also a method for producing mineral ion water for "a method for producing hydrogen gas on the present of the present invention" characterized in that the mineral ion water is made by dissolving at least oxide, hydroxide, carbonate, or hydrogencarbonate of magnesium or calcium in water to contain alkaline earth metal ions in the water, adjusting pH of the water, and dissolving a water-soluble component of organism-ash in the water.

The present invention is also mineral ion water "a method for producing hydrogen gas on the present of the present invention".

Mineral ion water of the present invention is both mineral ion water (A) for hydrogen gas generation and mineral ion water (B) which are impregnated in an organism-derived carbon precursor for the preparation of mineral-supported high-temperature burned carbonaceous substances. In addition, mineral ion water of the present invention can be used as a mineral conferring material, and a flame retardant supported agent for firing.

Mineral-Supported High-Temperature Burned Carbonaceous Substances

"Mineral-supported high-temperature burned carbonaceous substances" in the present invention are made by impregnating mineral ion water in an organism-derived carbon precursor and burning the precursor at high temperature. "An organism-derived carbon precursor" is "a substance which contains carbon as an element" which becomes a carbonaceous substance by burning and is organism-derived. "An organism-derived carbon precursor" includes a carbonaceous substance that maintains the state of a carbonaceous substance after high-temperature burning.

The term "carbonaceous substances" in "mineral-supported high-temperature burned carbonaceous substances" refers to an object consisting substantially of carbon (C). The "carbonaceous substances" includes organism-derived amorphous carbon, which is highly preferred as a carbon catalyst for generation of hydrogen gas of the present invention. However, another carbon groups such as graphite (natural graphite, black lead); graphene which consists of graphene structures stacked, are highly suitable as sources of mineral ion water-supported microwave-excited carbon high-temperature plasma.

The term "supported" in "mineral-supported high-temperature burned carbonaceous substances" includes a form in which mineral adheres to or is bonded to the surface of a carbonaceous substance, and a form in which a carbonaceous substance is porous and mineral is permeation-fixed or bonded into the pores.

"An organism" in "an organism-derived carbon precursor" include "an organism" in "a water-soluble components of organism-ash" which is a component of above-mentioned mineral ion water.

Plants or seaweeds are particularly preferred as "organisms" in "an organism-derived carbon precursor". Preferred plants or seaweeds are as those similar to those mentioned above. Among them, branches, trunks, wood, etc. of hardwood trees are suitable as "an organism-derived carbon precursor", since they have high density.

Materials contained in waste are also preferable as "organism-derived carbon precursors", in terms of environmental protection, cost reduction, etc. As the such waste, thinning wood, pruned wood of street tree, unwanted wood, unwanted bamboo, construction waste, waste paper, etc. are preferred. Among them, unwanted wood is particularly preferable.

By impregnating mineral ion water in these materials and then burning these materials under the condition oxygen (air) is blocked, "a mineral-supported high-temperature burned carbonaceous substance" that is dense or porous with a high surface area are obtained. Therefore, the production of more hydrogen gas can be achieved.

The organism-derived carbon precursors include not only a material which would become a carbonaceous substance only after burning, but also a material which have already been carbide and would be a carbonaceous substance even after burning. The latter include charcoal, bamboo charcoal, and the like. The charcoal includes black charcoal; white charcoal such as Bincho-tan; and the like.

In addition, "above materials" which would become (mineral-supported) carbonaceous substances only after (impregnating mineral ion water and then) burning, are also suitable.

A mineral-supported high-temperature burned carbonaceous substance may be a substance which is obtained by impregnating mineral ion water in the organism-derived carbon precursor and then burning. Also, a mineral-supported high-temperature burned carbonaceous substance may be a substance which is obtained by impregnating mineral ion water in the "organism-derived existing carbide" and then burning.

Specifically, for example, it is preferable to soak an organism-derived carbon precursor or an organism-derived carbide in mineral ion water at 20° C. for 1 to 6 hours, followed by drying and burning at high temperature.

The preferred concentrations (or particularly preferred concentrations) of alkaline earth metal ions in impregnated mineral ion water (B) are similar to those described above in the item <mineral ion water>.

When burning an organism-derived carbon precursor in a heating furnace, it is preferable to block air (oxygen). The temperature of burning is preferably 800° C. or higher to 1500° C. or lower, more preferably 900° C. or higher to 1500° C. or lower, and particularly preferably 1100° C. or higher to 1500° C. or lower.

Black charcoal, which is already a carbide, is a low-temperature burned product, and its burning temperature is around 500° C. Therefore, it must, be reburned after impregnation of mineral ion water, preferably at near 1100° C.

Burning may be performed in a heat-radiating type furnace or a heat-conducting type furnace in which air (oxygen) is blocked, but is particularly preferable to be performed by warming with microwave-excited carbon high-temperature plasma burning. In that case, burning can be achieved in a short time. Whereas in a normal heating furnace, long-lasting heating is required, carbon plasma burning using microwaves is preferable because a mineral-rich carbonaceous substance is obtained in a short time.

The present invention is more preferable to be "a method for producing hydrogen gas in which burning at high temperature is performed by microwave-excited carbon plasma". A microwave oven for home can be used source of microwave.

When burning an organism-derived carbon precursor by microwave excitation, the temperature ranges are similar to those in case burning by a heating furnace, but the time ranges are quite different and extremely short. Although the burning time varies depending on the volume of the organism-derived carbon precursor, high-temperature burning at 2 minutes or longer to 15 minutes or shorter is preferred (especially preferably 5 minutes or longer to 10 minutes or shorter).

Carbonaceous substances are produced by burning. At the same time, impregnated mineral ion water enhances mineral components of an organism-derived carbon precursor. Therefore, very mineral-rich carbonaceous substances are obtained.

Many more mineral components are supported on the surface, and in the pores such as micropores, mesopores, macropores, etc. of high-temperature burned carbonaceous substances. The pores include branched pores and unbranched pores. The minerals include alkaline earth metals (ions) and other metals (minerals).

It is revealed by the present invention that hydrogen gas is efficiently generated by contact of alkaline mineral ion water with such mineral-supported high-temperature burned carbonaceous substances.

The supported ratio (range) of mineral components to the whole mineral-supported high-temperature burned carbonaceous substances can be calculated from the concentration (range) of the mineral ion water described above and "the fraction of organism-derived carbon precursors and mineral ion water impregnated therein". The supported ratio (range) of mineral components is Preferably 1.4 to 15% by mass, more preferably 1.6 to 10% by mass, and particularly preferably 2 to 8% by mass.

If the supported ratio is too small or the burning temperature is too low, hydrogen gas may not be generated well. On the other hand, even if the supported ratio is small, by making carbon which is burned well at high temperature, the alkalinity is necessarily higher and the mineral component also tends to increase.

The burning may be performed with air (oxygen) blocked, as described above. But the burning may be performed at high temperature in the presence of a flame retardant. Specifically, for example, flame retardants are impregnated into an organism-derived carbon precursor by immersing the organism-derived carbon precursor in mineral ion water containing the flame retardants. Then, the organism-derived carbon precursor is dried and heated (burned).

That is, the present invention is preferably the above-mentioned method for producing hydrogen gas, wherein the mineral-supported high-temperature burned carbonaceous substances is obtained by impregnating "an alkaline aqueous solution consisting of dissolving a flame retardant in the above mineral ion water" in the organism-derived carbon precursor, and then burning the precursor at high temperature.

The flame retardant is not specifically limited, is water-soluble or water-dispersible, and may be general-purpose and environmentally friendly. The flame retardant is more preferable to be mineral-rich and to be alkaline. The flame retardant-supported high temperature-burned carbon is extremely suitable.

The present invention is also a mineral-supported high-temperature burned carbonaceous substances for the above-mentioned method of producing of hydrogen gas, characterized in that the mineral-supported high-temperature burned carbonaceous substances is made by impregnating the mineral ion water in an organism-derived carbon precursor and burning the precursor at high temperature.

It should be noted that some points of mineral-supported high-temperature burned carbonaceous substances are impossible or too difficult to be clarify by current analytical methods. Example of those points are, by what chemical structure the mineral components are supported on carbonaceous substances; how the carbonaceous substances are supported on porous substances; what trace elements are supported on the carbonaceous substances, where exteriorization of biogenic carbon precursors and mineral ion water is clear as mentioned above. Thus, the mineral-supported high-temperature burned carbonaceous substances of the present invention can only be identified by its producing method.

The present invention is also a method for producing antioxidant water derived from mineral ion water characterized in that the mineral ion water is altered by using method for producing hydrogen gas. Namely, when hydrogen gas is produced using the above-mentioned method for producing hydrogen gas, the mineral ion water used does not change in its property by carbon catalytic effect even if chemical change and composition have occurred, and alkaline antioxidant water is obtained as a by-product. This antioxidant water can be drunk and reused as a valuable material. In the conventional technique which used metals having high ionization tendency, water obtained after hydrogen gas generation cannot be used.

EXAMPLES

Hereinafter, the present invention will be explained more specifically by showing Examples and Comparative Examples; but the present invention is not limited to them unless beyond its scope.

Preparation of Mineral Ion Water

Example 1

15 parts by mass of slaked calcium (calcium hydroxide) and 1 part by mass of raw calcium (calcium oxide) were threw into demineralized water, and the pH of the solution (with unwanted substances) was finely adjusted to be 14. Next, the solution was stood still and maturated for more than 12 hours. Then, supernatant water was filtrated, and mineral ion water (1) having pH of 14.0 was obtained.

Example 2

Using seawater in place of demineralized water in Example 1, supernatant water was filtered, and mineral ion water (2) having pH of 14.0 was obtained.

Example 3

Mineral ion water (3) having pH of 14.0 was obtained in the same manner as in Example 1, except that 15 parts by mass of slaked calcium (calcium hydroxide) and 0.3 parts by mass of magnesium oxide were threw into demineralized water.

Example 4

Mineral ion water (4) having pH of 14.0 was obtained in the same manner as in Example 1, except that 3 parts by mass of ash of hondawara were additionally added.

Example 5

Mineral ion water (5) having pH of 14.0 was obtained in the same manner as in Example 1, except that 5 parts by mass of ash of tea shell were additionally added.

Preparation, of Mineral-Supported High-Temperature Burned Carbonaceous Substances Example 6

As flame retardants, 0.5 to 0.8 parts by mass of ammonium sulfate were respectively added into the above-mentioned mineral ion waters (1)-(5). They were stirred at 20° C. to dissolve ammonium sulfate. The obtained water solution had a pH of 10.

Using paper and pieces of wood cut in cross section as organism-derived carbon precursors, mineral-supported high-temperature burned carbonaceous substances were prepared as follows.

The paper was immersed in the alkaline water solution at 20° C. After removing the paper from the water solution, the excess liquid was squeezed and the paper was dried at 20° C.

"Pieces of wood cut almost perpendicularly to the vascular bundle" was immersed in the alkaline water solution at 20° C. for 6 hours. After removing the pieces of wood from the water solution, the excess liquid was squeezed and the pieces of wood was dried at 20° C. Note that, if pieces of wood were cut in cross section, permeability through the capillary is improved.

A part of organism-derived carbon precursors, in which mineral ion water was impregnated, was partially charred (carbonized) with gas fire.

Subsequently, a structure in which no thermal shock occurred was made by stacking a plaster board and "a highly adiabatic and non-combustible foam". The structure was set on the bottom of a flat-type microwave oven.

The partially carbonized organism-derived carbon precursor was placed on the structure set in the microwave oven, and microwave irradiation was initiated at 200 W power. The pre-carbonized site emitted high-temperature plasma luminescence immediately. The heat was conducted, and the whole of the organism-derived carbon precursor was plasma glowed within about 2 to 3 minutes. The other site which was not pre-carbonized also emitted plasma luminescence and glowed in a chain. The microwave irradiation time at this time was 4 minutes.

After removal from the microwave oven, the pieces of wood the wood fragments were glowed for a few minutes, during which they were extinguished with mineral ion water prepared separately. The composition of the mineral ion water was the same as that of the above-mentioned mineral ion water. Thus, black mineral-supported high-temperature burned carbonaceous substances were obtained.

The plasma temperature at this time ranged from 1000° C. to 1200° C., as measured by thermocouple thermometers. By irradiating microwaves, mineral-supported high-temperature burned carbonaceous substances were obtained easily in a short time.

By numbering "1" to "5" corresponding to "mineral ion water (1) to (5) obtained in Examples 1 to 5" impregnated in organism-derived carbon precursors, and by abbreviating the paper "P", the pieces of wood "W", and Example 6 "A", a total of 10 mineral-supported high-temperature burned carbonaceous substances (1PA) to (5PA), and (1WA)~(5WA) were obtained.

Example 7

A total of 10 mineral-supported high-temperature burned carbonaceous substances (1PB) to (5PB), and (1WB)~(5WB) were obtained in the same manner as in Example 6, except that the following points were changed. "0.595 parts by mass of borax, and 0.705 parts by mass of ammonium sulfate" were added as flame retardants instead of "0.5 to 0.8 parts by mass of ammonium sulfate". Further, the remaining component was replaced with the above-mentioned mineral ion water (1) to (5) so that the whole amount be 100 parts by mass. "B" indicates that it was obtained in Example 7.

Borax is not completely soluble in mineral ion water at 20° C. But the borax was completely soluble in the mineral ion water together with ammonium sulfate at 20° C. because the ammonium sulfate was dissolved.

The obtained "alkaline water solution containing flame retardants" had a pH of 12 and was very good.

Production of Hydrogen Gas

Example 8

A total of 10 mineral-supported high-temperature burned carbonaceous substances (1PB) to (5PB), and (1WB) to (5WB), prepared in Example 7, were placed with 18 g in a containers prepared in advance. The mineral-supported high-temperature burned carbonaceous substances were fixed below the container with a mesh-net and glass weight so that they were not floating on mineral ion water to be added later.

A 150 mL of 20° C. mineral ion water was injected into the container containing the mineral-supported high-temperature burned carbonaceous substances. The injected mineral ion water corresponded to mineral ion water (1)-(5) from which mineral-supported high-temperature burned carbonaceous substances (1PB)~(5PB) were prepared.

As a result, in only 1-2 seconds, hydrogen gas was continuously generated at the same time that air contained in the pores of a piece of wood appeared. The hydrogen gas continued to be produced even after one hour.

When the temperature of mineral ion water was set at 45° C., hydrogen gas was continuously produced more vigorously than that described above. Moreover, when the temperature of mineral ion water was set at 70° C., hydrogen gas erupted also from the surface and porous internal structure of the mineral-supported high-temperature burned carbonaceous substances.

Combinations of "mineral ion water (1)-(5)" and "mineral-supported high-temperature burned carbonaceous substances (1PB)~(5PB)" all generated hydrogen gas well. In addition, mineral-supported high-temperature burned carbonaceous substance (3PB) containing magnesium, and mineral-supported high-temperature burned carbonaceous substance (4) and (5) containing a water-soluble component of organism-ash, showed a better rate of hydrogen generation and a higher amount of hydrogen gas production than mineral-supported high-temperature burned carbonaceous substance (1).

Almost similar results were obtained when using mineral-supported high-temperature burned carbonaceous substances (1PA) to (5PA), and (1WA) to (5WA) prepared in Example 6 instead of mineral-supported high-temperature burned carbonaceous substances (1PB) to (5PB), and (1WB) to (5WB) prepared in Example 7.

Example 9

For 1 individual of the mineral-supported high-temperature burned carbonaceous substance (1WB) of 48 g prepared in Example 7, 1 L of 20° C. mineral ion water (1) prepared in Example 6 was injected.

In the reaction with a mineral-supported high-temperature burned carbonaceous substance, the generation of hydrogen gas erupted from fine pores of the mineral-supported high-temperature burned carbonaceous substance was high.

This mineral-supported high-temperature burned carbonaceous substance was highly porous, burned at high temperature, mineral-rich, and alkaline. Therefore, the mineral-supported high-temperature burned carbonaceous substance was considered to have an excellent hydrogen gas-generating ability. Since the mineral-supported high-temperature burned carbonaceous substance is highly porous, it seems that the amounts of mineral components distributed within it was high and that that more hydrogen gas was produced proportional to it.

When the reaction of metals having high ionization tendency is adopted instead of mineral ion water and carbonaceous substances, acidification od water by dissolution and oxidation of metals cause termination of generation of hydrogen gas. On the other hand, in highly alkaline mineral-rich carbon-catalytic reactions, generation of hydrogen persists because mineral ion water maintains high alkalinity.

The pH of mineral ion water after the hydrogen gas was completely exhausted by the reaction was kept 13, and it is presumed to be antioxidant water.

INDUSTRIAL APPLICABILITY

The method for producing hydrogen gas of the present invention can be widely used in the fields of energy applications and other fields such as fuel cells, hydrogen engines, supercritical fluid-driven propulsion, power generation, medical gas, and margarine manufacturing and drying. The method for producing hydrogen gas of the present invention enables countries with scarce resources become environmentally friendly clean energy nations.

The invention claimed is:

1. A method for producing hydrogen gas, the method comprising:
reacting a first reactant and a second reactant,
wherein the first reactant is mineral ion water (A) containing at least alkaline earth metal ions and having pH of 11 or more to 14 or less, and
wherein the second reactant is a carbonaceous substance made by impregnating mineral ion water (B) in an organism-derived carbon precursor and burning the precursor at 800° C. or higher to 1500° C. or lower.

2. The method for producing hydrogen gas according to claim 1, wherein the second reactant is obtained by impregnating an alkaline aqueous solution consisting of dissolving a flame retardant in the above mineral ion water (B) in the organism-derived carbon precursor, and then burning the precursor.

3. The method for producing hydrogen gas according to claim 1, wherein a process of burning the precursor is performed by microwave-excited carbon plasma.

4. The method for producing hydrogen gas according to claim 1, wherein the organism-derived carbon precursor is a grass, seaweed, charcoal or bamboo charcoal.

5. The method of producing hydrogen gas according to claim 1, wherein the mineral ion water (A) or the mineral ion water (B) contains a water-soluble component of organism-ash.

6. The method of producing hydrogen gas according to claim 5, wherein the organism-ash is that of a protist or a plant.

7. A method for producing mineral ion water (A) for the method of producing hydrogen gas according to claim 1, characterized in that the mineral ion water (A) is made by dissolving at least oxide, hydroxide, carbonate, or hydrogencarbonate of magnesium or calcium in water to contain alkaline earth metal ions in the water, adjusting pH of the water, and dissolving a water-soluble component of organism-ash in the water.

8. A method for producing mineral ion water (B) for the method of producing hydrogen gas according to claim 1, characterized in that the mineral ion water (B) is made by dissolving at least oxide, hydroxide, carbonate, or hydrogencarbonate of magnesium or calcium in water to contain alkaline earth metal ions in the water, adjusting pH of the water, and dissolving a water-soluble component of organism-ash in the water.

\* \* \* \* \*